US008610792B2

(12) United States Patent
Suito

(10) Patent No.: US 8,610,792 B2
(45) Date of Patent: Dec. 17, 2013

(54) IMAGING APPARATUS AND IMAGING METHOD

(75) Inventor: Hiroshi Suito, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 27 days.

(21) Appl. No.: 13/386,465

(22) PCT Filed: Jul. 22, 2010

(86) PCT No.: PCT/JP2010/062743
§ 371 (c)(1),
(2), (4) Date: Jan. 23, 2012

(87) PCT Pub. No.: WO2011/010747
PCT Pub. Date: Jan. 27, 2011

(65) Prior Publication Data
US 2012/0120275 A1   May 17, 2012

(30) Foreign Application Priority Data
Jul. 24, 2009   (JP) .................................. 2009-172853

(51) Int. Cl.
H04N 5/228   (2006.01)
(52) U.S. Cl.
USPC ..................................................... 348/222.1
(58) Field of Classification Search
None
See application file for complete search history.

(56) References Cited

U.S. PATENT DOCUMENTS

| 5,264,939 | A | * | 11/1993 | Chang ........................... 348/322 |
| 5,321,509 | A | * | 6/1994 | Kannegundla ................ 348/521 |
| 5,489,945 | A | * | 2/1996 | Kannegundla et al. ....... 348/521 |
| 7,796,177 | B2 | | 9/2010 | Okumura |

FOREIGN PATENT DOCUMENTS

| JP | 2003-60994 A | 2/2003 |
| JP | 2003-92698 A | 3/2003 |
| JP | 2004-289636 A | 10/2004 |
| JP | 2006-197322 A | 7/2006 |
| JP | 2007-104564 A | 4/2007 |
| JP | 2007-110470 | * 4/2007 |
| JP | 2008-35474 A | 2/2008 |
| JP | 2008-236808 A | 10/2008 |

* cited by examiner

Primary Examiner — Luong T Nguyen
(74) Attorney, Agent, or Firm — Dickstein Shapiro LLP

(57) ABSTRACT

An imaging apparatus includes an image pickup device configured to output an image signal, an analog image processing device having an A/D converter configured to convert the output image signal from the image pickup device into a digital image signal and transfer the digital image signal, a digital image processing device configured to load the transferred digital image signal and perform an image processing on the loaded digital image signal, a clock generator configured to supply a clock having a frequency to each of the image pickup device, the analog image processing device, and the digital image processing device to drive the image pickup device, the analog image processing device and the digital image processing device at a predetermined driving frequency, and a controller configured to perform a monitoring stop processing to stop the transfer of the digital image signal from the analog image processing device and the image processing of the digital image processing device in a predetermined state.

13 Claims, 6 Drawing Sheets

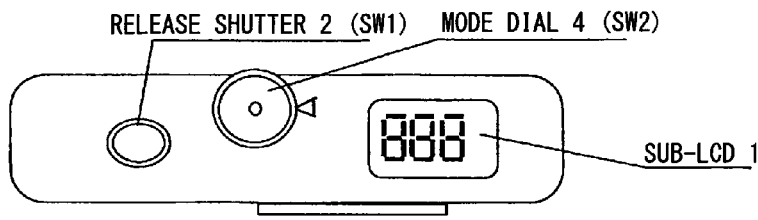
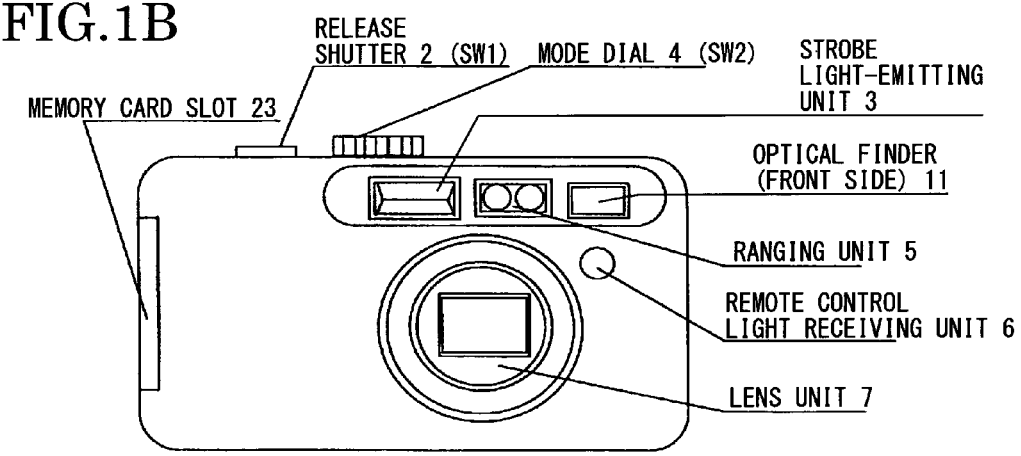
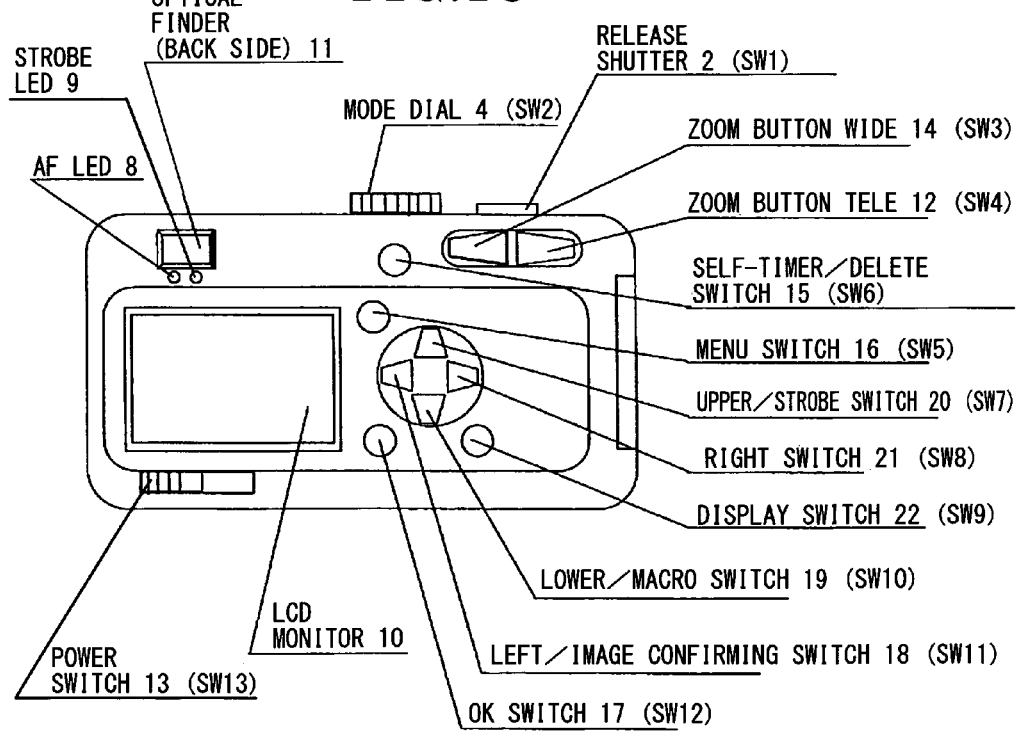

IMAGING APPARATUS AND IMAGING METHOD

TECHNICAL FIELD

The present invention relates to an imaging apparatus and an imaging method, more specifically, to an imaging apparatus and an imaging method suitable to reduce a release time lag in photographing.

BACKGROUND ART

As to imaging apparatuses such as digital still cameras (hereinafter, referred to as digital cameras), it is important to increase the battery life. Consequently, methods to achieve power saving in the control of a digital camera are conventionally used. As one of them, there is a technology to try power saving by lowering a frame rate during monitoring.

The frame rate can be lowered by lowering a frequency of a clock to be supplied to an image pickup device, a timing generator (hereinafter, referred to as TG), an A/D converter, and the like. Since a rate of output of data from an image sensor is lowered by lowering the frame rate, power consumption per unit time in a signal processing IC can be reduced.

As such a technology, for example, as shown in Japanese Patent Laid-Open Publication Number 2007-104564, there is disclosed an imaging apparatus which maintains response in photographing and also achieves low power consumption in a low power consumption mode that stops a screen display; which reduces power consumption of an image pickup device by driving a CCD by a slow clock; which provides a quick response by performing photometry continuously; and which reduces power consumption by stopping an image processing in an image processing unit and an operation in a display device.

Further, as shown in Japanese Patent Laid-Open Publication Number 2003-92698, there is disclosed an imaging apparatus which can change a frequency of a clock which is output from a clock generator to a timing generator in accordance with an updating speed of a frame, set by a user, during monitoring.

Furthermore, as shown in Japanese Patent Laid-Open Publication Number 2003-60994, there is disclosed an imaging apparatus of which a driving frequency to drive a CCD can be changed over between a first frequency and a second frequency, which is lower than the first frequency, that are generated from a clock supplied from a clock generation device in accordance with a plurality of predetermined read-out modes. In a technique described in Japanese Patent Laid-Open Publication Number 2003-60994, a balance between power saving and performance is achieved by changing the driving frequency in accordance with a driving mode (a read-out mode) of an image pickup device, for example, by heightening the frequency in a mode such as for a still image loading which has to read out a large number of pixels.

Moreover, as shown in Japanese Patent Laid-Open Publication Number 2008-35474, there is disclosed a digital camera which performs displaying of a through-image at a first updating cycle until a half-pressing operation of a release button and at a second updating cycle, which is shorter than the first updating cycle, after the half-pressing operation of the release button.

However, according to the above-mentioned techniques described in Japanese Patent Laid-Open Publication Numbers 2007-104564, 2003-92698, and 2003-60994, while power saving can be achieved by lowering a frame rate for monitoring, if the frame rate is lowered too much, a problem arises, for example, such that a subject following capability worsens and a finder function as a camera cannot be performed. Further, a problem arises such that the display quality level decreases by an increase in the amount of smear in a case where a CCD is adopted as an image pickup device. Furthermore, there is a problem such that a control response worsens. That is to say, a control timing depends on the frame rate since an image is generally processed in synchronization with each frame in a signal processing IC.

On the other hand, according to the technique described in Japanese Patent Laid-Open Publication Number 2008-35474 mentioned above, regarding the problem such that a finder function cannot be performed, it is easy to get a timing to release a shutter since a through-image displayed on a monitor becomes smooth by heightening a frame rate after the half-pressing operation of the release button. In addition, regarding the problem such that a control response worsens, the response does not worsen since still image photographing is started from a monitoring state at a high frame rate by heightening the frame rate after the half-pressing operation of the release button. However, in a technique described in Japanese Patent Laid-Open Publication Number 2008-35474, power saving cannot be achieved after the half-pressing operation of the release button, and nothing is disclosed regarding shifting from a monitoring state at a low frame rate to still image photographing.

In addition, in a photographing sequence, a state of a signal processing IC when shifting from a monitoring state to still image photographing is shifted in the following order: "monitoring data loading", "monitoring image loading stop", and "still image data loading". Accordingly, a processing time for performing stopping of loading after the monitoring data loading depends on a frame rate for monitoring. That is to say, a lot of time is needed to stop loading if the frame rate is lowered for power saving; therefore, there is a problem such that a release time lag is increased. Further, there is a problem such that a lot of time is needed for a monitoring data loading stop processing not only in a case of shifting from a monitoring state at a low frame rate to still image photographing, but also in a case of shifting from a monitoring state at a low frame rate to another state.

SUMMARY OF INVENTION

An object of the present invention is to provide an imaging apparatus and an imaging method capable of reducing a release time lag by heightening a frame rate for monitoring when a monitoring stop processing to stop a transfer of a digital image signal from an analog image processing device and an image processing of a digital image processing device is performed in a photographing sequence, even if the frame rate for the monitoring is lowered for power saving and so on.

To achieve the above object, an imaging apparatus according to an embodiment of the present invention includes an image pickup device configured to output an image signal, an analog image processing device having an A/D converter configured to convert the output image signal from the image pickup device into a digital image signal and transfer the digital image signal, a digital image processing device configured to load the transferred digital image signal and perform an image processing on the loaded digital image signal, a clock generator configured to supply a clock having a frequency to each of the image pickup device, the analog image processing device, and the digital image processing device to drive the image pickup device, the analog image processing device and the digital image processing device at a predetermined driving frequency, and a controller configured to perform a monitoring stop processing to stop the transfer of the digital image signal from the analog image processing device and the image processing of the digital image processing device.

The clock generator is configured to change the frequency of the clock to drive the image pickup device, the analog image processing device, and the digital image processing device at a higher driving frequency than the predetermined driving frequency in a case where the controller performs the monitoring stop processing in a state where the image pickup device, the analog image processing device, and the digital image processing device are driven at the predetermined driving frequency.

BRIEF DESCRIPTION OF DRAWINGS

FIGS. 1A, 1B, and 1C are examples of external views of an imaging apparatus (a digital camera) according to an embodiment of the present invention; FIG. 1A shows a top view, FIG. 1B shows a front view, and FIG. 1C shows a back view of the camera.

MODE FOR CARRYING OUT THE INVENTION

Hereinafter, a structure of an imaging apparatus according to an embodiment of the present invention will be explained in detail with reference to the accompanying drawings FIGS. 1A to 6.

Figure 2:
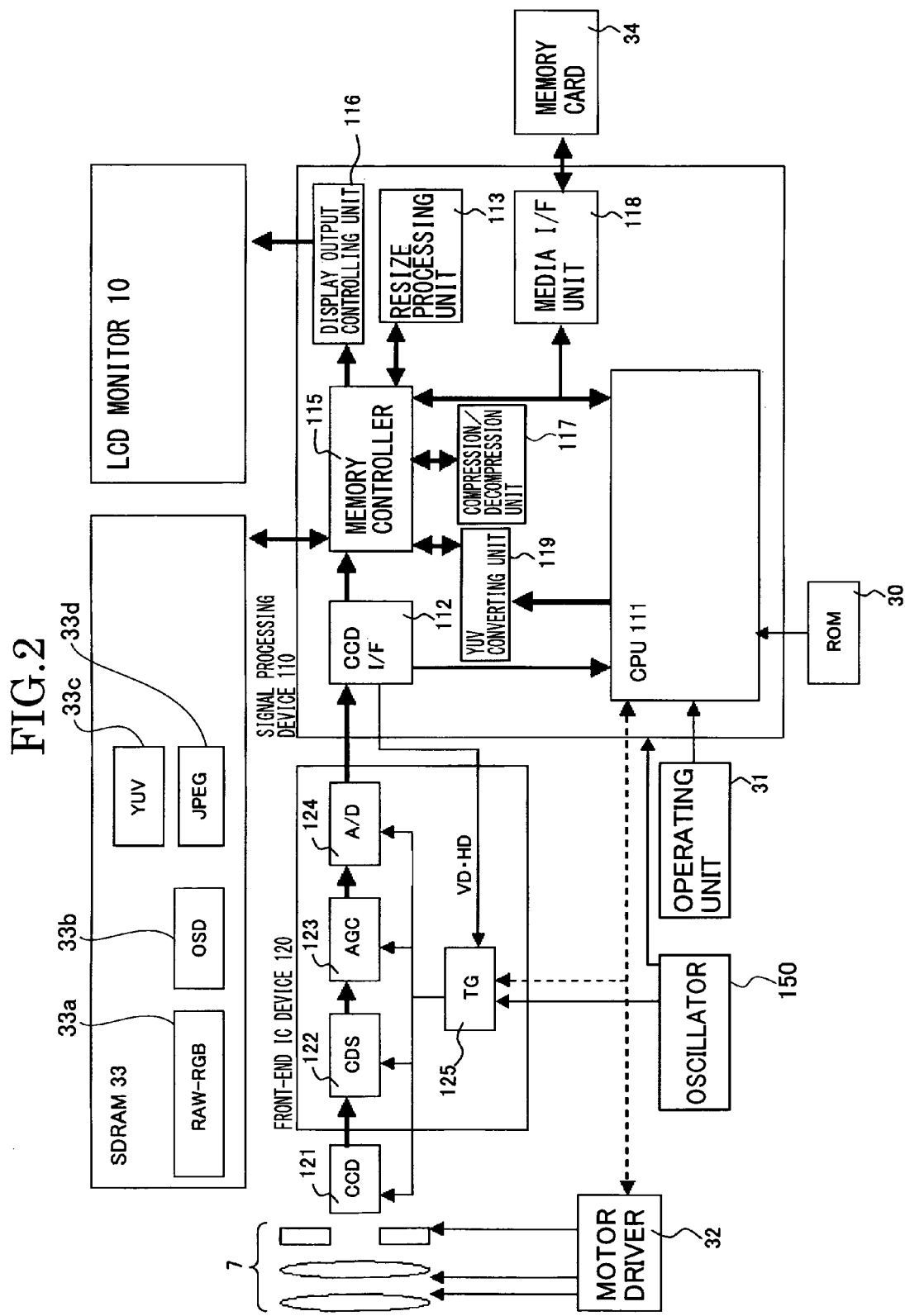
FIG. 2 is an example of a function block diagram of an imaging apparatus according to an embodiment of the present invention.

The imaging apparatus according to an embodiment of the present invention includes, for example, as shown in FIG.2, an image pickup device 121 configured to output an image signal, an analog image processing device 120, for example a front-end IC device 120 connected to the image pickup device 121, a digital image processing device 110, for example a signal processing device 110 connected to the front-end IC device 120, a display unit 10 connected to the signal processing device 110, and an SDRAM (Synchronous Dynamic Random Access Memory) 33 connected to the signal processing device 110.

The front-end IC device 120 includes a CDS (Correlated Double Sampling) 122 connected to the image pickup device 121, an AGC (Auto Gain Control) 123 connected to the CDS 122, an A/D converter 124 connected to the AGC 123 and configured to convert the output image signal from the image pickup device 121 into a digital image signal and transfer the digital image signal to the signal processing device 110, and a timing generator (TG) 125 configured to generate a timing signal to drive the image pickup device 121. The signal processing device 110 is configured to load the transferred digital image signal from the A/D converter 124 and perform an image processing on the loaded digital image signal.

The display unit 10 is, for example, an LCD monitor 10. The signal processing device 110 includes a display output controlling unit 116 configured to load a monitoring image formed based on the digital image signal processed by the signal processing device 110 and display the monitoring image on the display unit 10 for monitoring.

A clock generator 150, such as an oscillator 150, is configured to supply a clock having a predetermined frequency to each of the image pickup device 121, the front-end IC device 120, and the signal processing device 110, in particular a controller 111 provided in the signal processing device 110 to drive the image pickup device 121, the front-end IC device 120 and the signal processing device 110 at a predetermined driving frequency. The controller 111 is configured to perform a monitoring stop processing to stop the transfer of the digital image signal from the front-end IC device 120 and the image processing of the signal processing device 110. In the illustrated embodiment, the controller 111 comprises a CPU (Central Processing Unit) 111.

The clock generator 150 is configured to change a frequency of the clock, for example, to be higher than the predetermined frequency and supply the clock having the higher frequency to each of the image pickup device 121, the front-end IC device 120, and the signal processing device 110 to drive the image pickup device 121, the front-end IC device 120 and the signal processing device 110 at a higher driving frequency than the predetermined driving frequency in a case where the controller 111 performs the monitoring stop processing in a state where the image pickup device 121, the front-end IC device 120, and the signal processing device 110 are driven at the predetermined driving frequency.

The SDRAM 33 includes a RAW-RGB 33a, an OSD 33b, a YUV 33c and a JPEG 33d.

(Structure of an Imaging Apparatus)

A digital camera to which the imaging apparatus according to the present invention is applied will be explained in an embodiment of the present invention. FIGS. 1A to 1C show an external view of a digital camera, wherein FIG. 1A is a top view, FIG. 1B is a front view, and FIG. 1C is a back view of the digital camera.

As shown in FIG. 1A, the digital camera has a sub-LCD 1, a release shutter 2 (SW1), and a mode dial 4 (SW2) on an upper surface thereof.

Further, as shown in FIG. 1B, the digital camera has a strobe light-emitting unit 3, a ranging unit 5, a remote control light receiving unit 6, a lens unit 7, and an optical finder (front side) 11 on a front surface thereof. Further, a memory card slot 23 is a slot in which a memory card 34 such as an SD card is inserted and is provided on a side surface of the digital camera.

Furthermore, as shown in FIG. 1C, the digital camera has an AF LED (Auto Focus LED) 8, a strobe LED 9, an LCD monitor 10, an optical finder (back side) 11, a zoom button TELE12 (SW4), a power switch 13 (SW13), a zoom button WIDE14 (SW3), and a self-timer/delete switch 15 (SW6) on a back surface thereof.

Moreover, the digital camera also has a menu switch 16 (SW5), an OK switch 17 (SW12), a LEFT/image confirming switch 18 (SW11), a lower/macro switch 19 (SW10), an upper/strobe switch 20 (SW7), a RIGHT switch 21 (SW8), and a display switch 22 (SW9) to display an image on the back surface thereof.

FIG. 2 shows a function block diagram of a control system of the digital camera shown in FIGS. 1A to 1C. Hereinafter, an internal system structure of the digital camera will be explained.

The lens unit 7 including a zoom lens, a focus lens, and a mechanical shutter is driven by a motor driver 32. The motor driver 32 is controlled by the controller 111 included in the signal processing device 110.

The aforementioned imaging apparatus is more specifically described.

The image pickup device 121, which comprises, for example, a CCD (Charge-Coupled Device), is, for example, a solid-state image sensing device that performs a photoelectric conversion of an optical image from the lens unit 7. In the front-end IC device 120, the CDS 122 is configured to perform sampling and holding (correlated double sampling) on the output image signal (analog image data) from the image pickup device 121, the AGC 123 is configured to adjust a gain of the sampled data, and the timing generator 125 is configured to be supplied with a vertical synchronizing signal (VD), that is a sensor VD and a horizontal synchronizing signal (HD) from a CCD I/F (interface) 112, which is described hereinafter, and generate the timing signal to drive the image pickup device 121 and the front end IC device 120.

The clock generator 150 supplies a system clock to the signal processing device 110 including the controller 111 and a clock to the timing generator 125 and so on, as mentioned above. The timing generator 125 receives the clock from the clock generator 150 and supplies a pixel clock to perform pixel synchronizing to the signal processing device 110, for example the CCD I/F 112.

The digital image signal which is input from the front-end IC device 120 to the signal processing device 110 is temporarily stored as RGB data (RAW-RGB) 33a on the SDRAM 33 by a memory controller 115, which is described hereinafter, via the CCD I/F 112.

The signal processing device 110 includes the controller 111 configured to perform a system control, the CCD I/F 112, a resize processing unit 113, the memory controller 115, the display output controlling unit 116, a compression/decompression unit 117, a media I/F (interface) unit 118, a YUV converting unit 119, and so on.

The CCD I/F 112 outputs the vertical synchronizing signal (VD) and the horizontal synchronizing signal (HD) to the timing generator 125 as mentioned above, loads the digital (RGB) image signal input from the A/D converter 124 in synchronization with these synchronizing signals, and writes the RGB data 33a on the SDRAM 33 via the memory controller 115.

The display output controlling unit 116 is configured to send display data written on the SDRAM 33 to the display unit 10 and display a photographed image. The display output controlling unit 116 can display the image on the LCD monitor 10 which the digital camera houses as well as on an external device by outputting the image as a TV video signal.

The term "display data" here includes YCbCr data of a natural image and OSD (on-screen display) data 33b for displaying a photographing mode icon and the like. The memory controller 115 reads out these data stored on the SDRAM 33 and sends them to the display output controlling unit 116. Then, the data combined in the display output controlling unit 116 are output as video data.

The compression/decompression unit 117 performs compression of the YCbCr data written on the SDRAM 33 and outputs data encoded by a JPEG (Joint Photographic Experts Group) method in a recording operation, and performs decompression of the JPEG encoded data 33d which are read out from the SDRAM 33 into the YCbCr data and outputs them in a reproducing operation.

The media I/F unit 118, in accordance with a command by the controller 111, reads out data on the memory card 34 to the SDRAM 33 as well as writes data on the SDRAM 33 onto the memory card 34.

The YUV converting unit 119 converts the RGB data 33a temporarily stored on the SDRAM 33 into luminance Y data and color difference CbCr data (YUV data 33c) based on image development-processing parameters set by the controller 111 and rewrites them on the SDRAM 33.

Further, when the digital camera is started, the controller 111, which is a control unit configured to control operations of the full digital camera, loads a control program and control data, configured to perform a digital camera control, which is stored on a ROM (Read Only Memory) 30 to, for example, the SDRAM 33 and controls the operations of the full digital camera based on the program code.

The controller 111 performs an imaging operation control, a setting of the image development-processing parameters, a memory control, a display control, and the like according to a command by buttons or the like of an operating unit. 31, an external operational command by a remote controller or the like not shown in any accompanying drawings, or a communication operational command by a communication from an external terminal such as a personal computer.

The operating unit 31 is for photographers to give commands of digital camera operations and has, as shown in FIGS. 1A to 1C, various buttons such as the release shutter 2 which can be pressed in two steps (such as half-pressed and fully-pressed) to give instructions about photographing and the zoom buttons 12 and 14 to set a magnification of an optical zoom and an electronic zoom.

When the controller 111 detects that the power switch 13 of the digital camera is on by the operating unit 31, the controller 111 performs predetermined settings to each of the blocks, that is to say, the YUV converting unit 119 and so on. According to these settings, an image by receiving light in the image pickup device 121 via the lens unit 7 is converted into the digital image signal and input into the signal processing device 110.

The digital image signal input into the signal processing device 110 is at first input into the CCD OF 112. In the CCD I/F 112, a processing such as adjustment of a black level is performed on the digital image signal, and RAW-RGB data 33a are temporarily stored on the SDRAM 33. The RAW-RGB data 33a stored on the SDRAM 33 are read out to the YUV converting unit 119, subjected to a gamma converting processing, a white balance processing, an edge enhancing processing, and a YUV converting processing, and rewritten on the SDRAM 33 as YUV image data.

In the signal processing device 110, the following processing is performed. The YUV image data are read out to the display output controlling unit 116. In a case where an output device is, for example, a TV of the NTSC system, the YUV image data are subjected to a variable magnification processing horizontally and vertically in accordance with the NTSC system by the resize processing unit 113 and output on the TV. Monitoring in which an image to be photographed is displayed on, for example, the LCD monitor 10 for confirmation before still photographing is performed by such a processing which is performed with respect to each VD.

(Imaging Method)

Hereinafter, as an imaging method of a digital camera according to an embodiment of the present invention (an imaging method according to an embodiment of the present invention), controls of a camera head and the signal processing device 110 in a case where an image processing is stopped in a still image photographing sequence will be explained. At first, a conventional still image photographing sequence will be explained with reference to FIG. 3 and FIG. 4 to compare with an imaging method according to an embodiment of the present invention. In addition, to make explanations clear, FIG. 3 and FIG. 4 will be explained with the same reference numbers as those shown in FIGS. 1A to 1C and FIG. 2.

Figure 3:
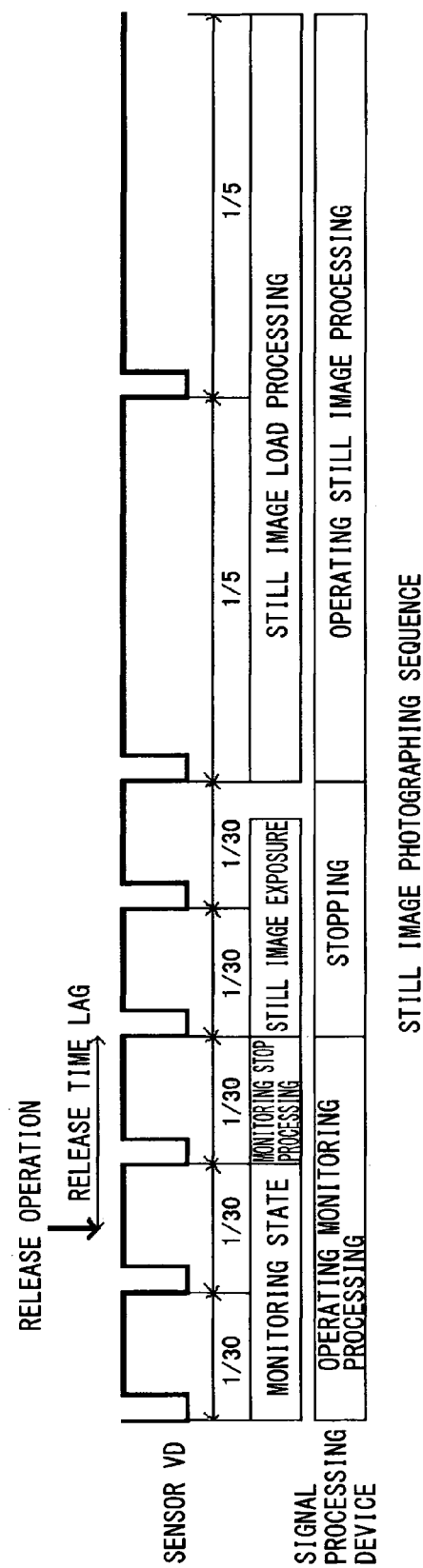
FIG. 3 is an explanatory drawing of a conventional still image photographing sequence.

FIG. 3 shows a general still image photographing sequence. A "release operation" in FIG. 3 shows an operation in which a user fully-presses the release shutter 2 to photograph a still image and is in a state where an AE (Auto Exposure) processing and an AF (Auto Focus) processing have been completed by the user's half-pressing before the fully-pressing. Monitoring before the release operation is performed at a frame rate of 1/30, and the signal processing device 110 processes an image which is input in frame in synchronization with the frame rate. The frame rate is determined based on a driving mode (a read-out mode) and a driving frequency which are supported by the image pickup device 121 and the timing generator 125. Here, a monitoring driving as the driving mode is selected, and a clock of 36 Mhz is supplied. Accordingly, the frame rate of 30 FPS (Frames Per Second) can be achieved (a monitoring state).

In this monitoring state, an AE processing and an AWB (Auto White Balance) processing are performed. The AE processing and the AWB processing are achieved by using functions of the signal processing device 110. For example, an accumulated value of each of R, G, and B signals is estimated in each of 256 areas of one screen which is divided into 16 lines and 16 rows, and then a Y value for a brightness and a ratio of the accumulated value of G signal to the accumulated value of each of R signal and B signal (G/R, G/B) are estimated in each of the divided 256 areas. Suitable setting values for brightness and WB based on the estimated Y value and color information are estimated. In addition, although various methods of algorithms achieving these estimations are used, known or new methods of estimations can be used without any limitation in an embodiment of the present invention.

An AF processing is performed prior to photographing when the release shutter 2 is pressed by the user's operation. As to the AF processing, for example, a contrast AF which finds a maximum value of a contrast by moving the focus lens is performed. The contrast AF estimates an AF evaluated value from a high-frequency component of the G signal of the video signal (or the Y signal as a luminance value), estimates a focus lens position at which the AF evaluated value becomes maximum, and moves the focus lens. In addition, as to an area to estimate the AF evaluated value, there are a multi-area AF to consider more than one area of a subject, a spot-area AF to consider only a partial area of a subject, and so on. Then, a suitable focus position for a photographing scene is estimated based on the AF evaluated value, and the focus lens is moved to the position. The focus lens can be moved via the motor driver 32 for the lens unit 7 by a command by the controller 111.

Then, an estimating/setting of each of the number of an electronic shutter, the AGC 123, and an aperture value for a still image photographing is performed (an AE processing for a still image), and then an exposure for a still image recording is performed. In accordance with a command by the controller 111, the setting of each of the electronic shutter and the AGC 123 can be performed by the timing generator 125 configured to control driving of the image pickup device 121 and an AFE, respectively. At the point of time of completion of the exposure for the still image, the mechanical shutter is closed, and RAW-RGB data 33a for the still image are output from the image pickup device 121. In addition, in an imaging apparatus which can be half-pressed (hereinafter, referred to as a release operation 1) and fully-pressed (hereinafter, referred to as a release operation 2), a control such that an estimation for each of the AF processing and the AE processing is performed at the time of the release operation 1, and the exposure for the still image recording is performed at the time of the release operation 2 is general. Moreover, a processing to stop an image loading operation (a monitoring stop processing) in the signal processing device 110 is performed in a process of shifting a processing from the monitoring to the exposure for the still image recording.

A processing to convert the digital image signal input from the front-end IC device 120 into data in a YUV format which can display the video signal is performed in the signal processing device 110. To input the digital image signal into the signal processing device 110, which type of format (width, height, and data volume) image data of one frame are in needs to be set, and a DMA (Direct Memory Access) for input and output is to be set. In addition, regarding the DMA, a known or new structure can be used without any limitation. However, a format for transferred image data is specified, and the signal processing device 110 performs a processing in sequence until all the data of a specified size are input.

A setting for data loading of a next frame is repeated upon completion of a data processing of one frame, and a sequential image processing is performed. In the monitoring stop processing, stopping of data output of the front-end IC device 120 is performed, and data loading of a next frame in the signal processing device 110 is not performed, by the controller 111. In other words, in the monitoring stop processing, stopping of each of the transfer of the digital image signal from the front-end IC device 120 and the image processing of the signal processing device 110 is performed by the controller 111. In addition, since a signal processing for the monitoring is performed in frame in the signal processing device 110 as mentioned above, the monitoring stop processing is also performed in synchronization with a completion of a processing of a frame being currently processed. That is to say, the monitoring stop processing takes a processing time at least until a processing of a frame being processed when the stop processing is started is completed. Data of the frame being processed synchronize with image data output from the camera head, and therefore, the processing of the data depends on the frame rate.

Figure 4:
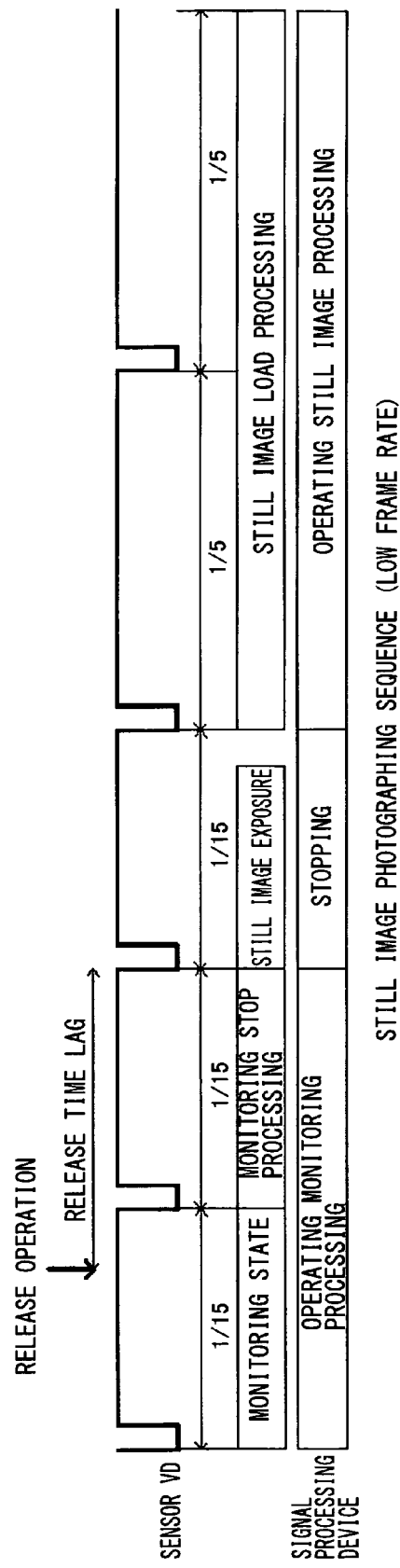
FIG. 4 is an explanatory drawing of a conventional still image photographing sequence in a case of a low frame rate.

FIG. 4 shows a still image photographing sequence when the monitoring is performed at a low frame rate for power saving. As to the same points as those in FIG. 3, explanations will be omitted. Although a clock of 36 Mhz is supplied to the timing generator 125 and so on in the monitoring shown in FIG. 3, in an example shown in FIG. 4, the timing generator 125 and so on are driven at a clock of 18 Mhz, and a frame rate becomes 15 FPS, which is a half of the rate in FIG. 3. In this case, since it also takes 1/15 second to process one frame, and the monitoring stop processing also takes more time in comparison with the time in FIG. 3, the release time lag is further increased.

Figure 5:
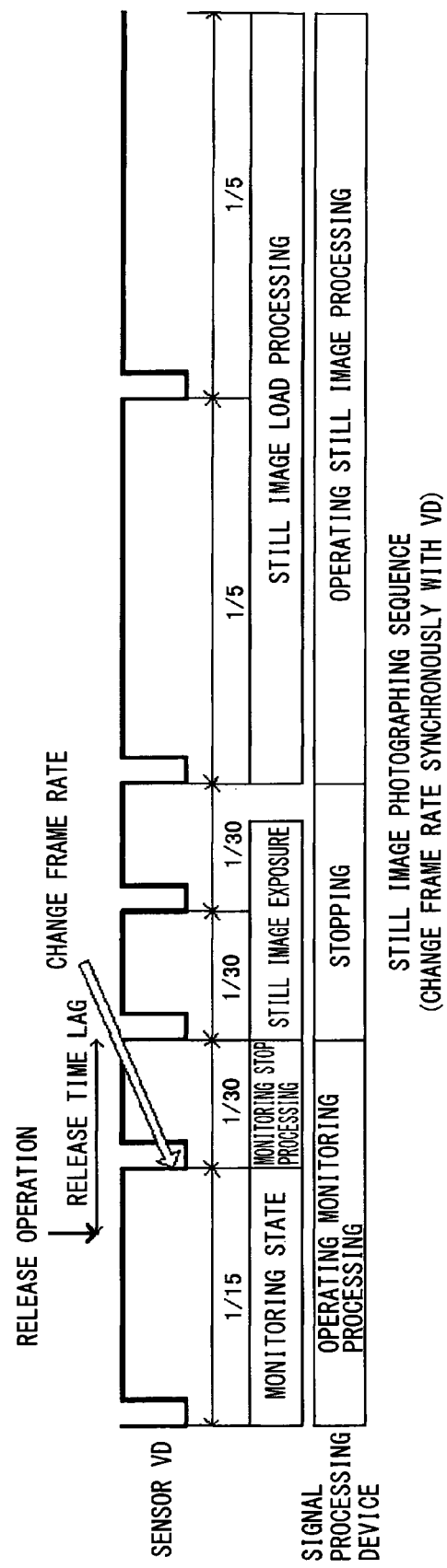
FIG. 5 is an explanatory drawing of a still image photographing sequence in a case of changing a frame rate synchronously with a VD (vertical synchronizing signal) according to an embodiment of the present invention.
Figure 6:
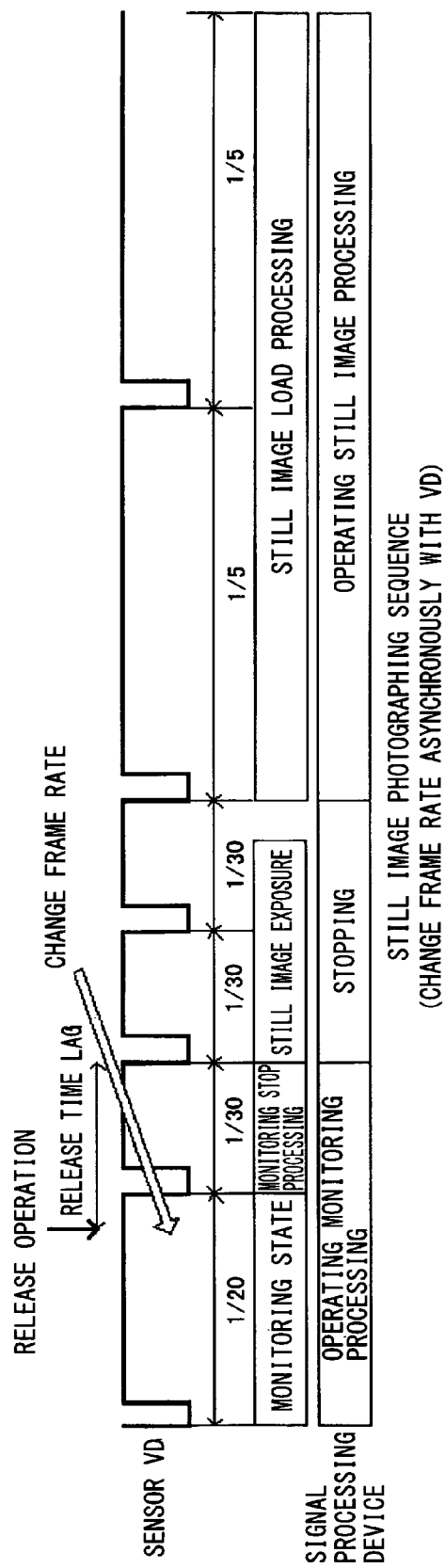
FIG. 6 is an explanatory drawing of a still image photographing sequence in a case of changing a frame rate asynchronously with a VD according to an embodiment of the present invention.

Meanwhile, FIG. 5 is an example of an imaging method according to an embodiment of the present invention and shows a still image photographing sequence in a case where a time for a stop processing is shortened by changing a frame rate for a monitoring stop processing, and a release time lag is reduced in comparison with that in FIG. 4. In addition, a "release operation" in FIG. 5 and FIG. 6 shows an operation where a user fully-presses the release shutter 2 and photographs a still image, that is to say, shows that the frame rate for the monitoring stop processing is heightened when the release shutter 2 is fully-pressed in a monitoring state in which a through-image is displayed in a half-pressed state after the release shutter 2 is half-pressed during the monitoring.

In this point, a change of the frame rate is achieved by a command by the controller 111 in the signal processing device 110. During the monitoring, a clock having a frequency of 18 Mhz is supplied from the clock generator 150 to lower the frame rate (15 FPS) for power saving. During the monitoring stop processing in the release operation 2 in which the release shutter 2 is released (fully-pressed), a clock having a frequency of 36 Mhz is supplied from the clock generator 150 to shorten a necessary time for the stop processing.

In this point, the image pickup device 121 may be driven by the vertical synchronizing signal (VD), and the frame rate, that is, the frequency of the clock may be changed immediately after the release shutter 2 is pressed or synchronously with the VD as shown in FIG. 5 by, for example, the controller 111. Generally, since there is a case that a change of a parameter to be set, such as an electronic shutter, may be needed dependent on the frame rate, it is preferable that settings of the frame rate and others be performed in synchronization with the VD.

By performing the control mentioned above, power saving can be achieved by lowering the frame rate during the monitoring, and an increase of the release time lag due to the power saving can be kept to a minimum.

FIG. 6 is an example in which the image pickup device 121 may be driven by the vertical synchronizing signal (VD), and the frame rate, that is, the frequency of the clock is changed by the controller 111 asynchronously with the VD. As to the same points as those in FIG. 5, explanations will be omitted. In an example shown in FIG. 6, although the monitoring is performed at the frame rate of ⅟15, the frequency of the clock is changed immediately in the middle of a frame after the release shutter 2 is released (fully-pressed). That is why the frame rate of ⅟15 is changed to ⅟20 (20 FPS).

In this point, if the frequency of the clock is changed asynchronously with the VD, it becomes a problem in that an exposure time, for example, being set as an AE is changed. However, in a case where image data at the timing at which the frequency of the dock is going to be changed are not needed (are not used for an image processing) in the first place, it does not become a problem even if the exposure time is changed. Therefore, for example, if it is a system in which an AE control for photographing is performed at the release operation 1 in the photographing sequence, it does not become a problem if a setting at the time of an exposure for a still image is set at the frame rate of the time as planned, even if the exposure time at the release operation 2 becomes inappropriate by the change of the frequency of the clock.

By performing the control mentioned above, power saving can be achieved by lowering the frame rate during the monitoring, and an increase of the release time lag due to the power saving can be kept to a minimum. Moreover, since a waiting time for synchronization with the VD can be shortened by performing the change of the frequency of the clock asynchronously with the VD in comparison with a system in which the change is performed in synchronization with the VD, the release time lag can be further reduced.

Hereinafter, a still image data load processing will be explained. The RAW-RGB data 33*a* for a still image are loaded to the SDRAM 33 via the signal processing device 110. In the signal processing device 110, the RAW-RGB data 33*a* for a still image are subjected to an image processing such as adjustments for a black level, a defective pixel, and shading and written on the SDRAM 33 as the RAW-RGB data 33*a*. In a case of an interlaced transfer, all CCD data are written on the SDRAM 33 as RAW-RGB data 33*a* by multiple transfers. Since a still image loading has to read out data of all pixels, unlike the monitoring, the frame rate is generally lowered. An example in which all pixels are read out by two times of the interlaced transfers is shown in an embodiment of the present invention. All the RAW-RGB data 33*a* loaded into the SDRAM 33 are subjected to, again via the signal processing device 110, all sorts of image processings such as an edge enhancement and a color setting in the YUV converting unit 119 after processings of a gain multiplication of a WB, a gamma correction, and an RGB interpolating processing, are converted into YUV data 33*c* as a luminance/color difference signal, and are rewritten on the SDRAM 33.

The data converted into YUV are full-sized (CCD size) and, if an image size to record is smaller than the CCD size, an image is reduced in the resize processing unit 113 in the signal processing device 110. A YUV image prepared for recording after being resized is subjected to a compression processing such as, for example, a compression by the JPEG method in accordance with a predetermined format in the compression/decompression unit 117. A result of the compression by the JPEG method is rewritten on the SDRAM 33. Then the data as the result of the compression by the JPEG method are stored on recording media such as the memory card 34 via the memory controller 115 after being subjected to a processing such as a header adding. Mentioned above is a still image photographing sequence in an embodiment of the present invention.

In addition, although the above-mentioned embodiments are the preferred embodiments of the present invention, the present invention may not be limited to these embodiments, and various changes to the embodiments may be made and carried out without departing from the scope of the invention.

For example, although the above-mentioned embodiments show that reductions of the release time lag can be achieved by speeding up the monitoring stop processing in photographing, speeding up can be achieved by heightening the frame rate not only in the photographing but also in the monitoring stop processing when a monitoring state is shifted to a reproducing state.

Moreover, although a digital camera is explained as an example of an imaging apparatus in the above-mentioned embodiments, the present invention may not be limited to a digital camera but also be applied to an image processing system having an image input device, an image processing device, and a display device, such as a hand scanner and a Personal Digital Assistant (PDA).

According to an embodiment of the present invention, since a frame rate can be changed by changing a frequency of a clock which is output from the clock generator 150, both power saving and a reduction of a release time lag can be achieved. That is to say, by lowering a frame rate during monitoring and then heightening the frame rate when a monitoring stop processing is performed, power saving in a monitoring mode can be achieved until starting of the monitoring stop processing, and moreover, an increase of a release time lag due to the power saving can be kept to a minimum, and a reduction of the release time lag can be achieved.

Although the present invention has been described in terms of exemplary embodiments, it is not limited thereto. It should be appreciated that variations may be made in the embodiments described by persons skilled in the art without departing from the scope of the present invention as defined by the following claims.

The invention claimed is:

1. An imaging apparatus, comprising:
   an image pickup device configured to output an image signal;
   an analog image processing device having an A/D converter configured to convert the output image signal from the image pickup device into a digital image signal and transfer the digital image signal;
   a digital image processing device configured to load the transferred digital image signal and perform an image processing on the loaded digital image signal;
   a clock generator configured to supply a clock having a frequency to each of the image pickup device, the analog image processing device, and the digital image processing device to drive the image pickup device, the analog image processing device and the digital image processing device at a predetermined driving frequency; and
   a controller configured to perform a monitoring stop processing to stop the transfer of the digital image signal from the analog image processing device and the image processing of the digital image processing device,
   wherein the clock generator is configured to change the frequency of the clock to drive the image pickup device, the analog image processing device, and the digital image processing device at a higher driving frequency than the predetermined driving frequency in a case where the controller performs the monitoring stop processing in a state where the image pickup device, the analog image processing device, and the digital image processing device are driven at the predetermined driving frequency.

2. The imaging apparatus according to claim 1, wherein the analog image processing device has a timing generator configured to generate a timing signal to drive the image pickup device and the analog image processing device.

3. The imaging apparatus according to claim 1, wherein the image pickup device is driven by a vertical synchronizing signal; and the clock generator is configured to change the frequency of the clock synchronously with the vertical synchronizing signal.

4. The imaging apparatus according to claim 1, wherein the image pickup device is driven by a vertical synchronizing signal; and the clock generator is configured to change the frequency of the clock asynchronously with the vertical synchronizing signal.

5. A method for imaging, comprising:
   forming an analog image signal at a predetermined timing;
   converting the analog image signal into a digital image signal and transferring the digital image signal;
   loading the transferred digital image signal and performing an image processing on the loaded digital image signal;
   generating a clock having a frequency to drive the forming of the analog image signal, the converting to the digital image signal and the processing of the digital image signal at a predetermined driving frequency;
   performing a monitoring stop processing to stop the transfer of the digital image signal and the image processing; and
   changing the frequency of the clock to drive the forming of the analog image signal, the converting to the digital image signal and the processing of the digital image signal at a higher driving frequency than the predetermined driving frequency, in a case of performing the monitoring stop processing in a state where the forming of the analog image signal, the converting to the digital image signal and the processing of the digital image signal are driven at the predetermined driving frequency.

6. The method for imaging according to claim 5, including driving the forming of the analog image signal through a vertical synchronizing signal; and performing the changing of the frequency of the clock synchronously with the vertical synchronizing signal.

7. The method for imaging according to claim 5, including driving the forming of the analog image signal through a vertical synchronizing signal; and performing the changing of the frequency of the clock asynchronously with the vertical synchronizing signal.

8. The imaging apparatus according to claim 1, wherein the controller is configured to start the monitoring stop processing concurrently with a first vertical synchronizing signal, and wherein forming an analog image signal starts concurrently with a second vertical synchronizing signal, and wherein the second vertical synchronizing signal occurs subsequent to the first vertical synchronizing signal.

9. The imaging apparatus according to claim 1, wherein the analog image processing device is configured to perform still image exposure, and wherein a frequency of a vertical synchronizing signal during the still image exposure is greater than the predetermined driving frequency.

10. The imaging apparatus according to claim 9, wherein a frequency of the vertical synchronizing signal before the monitoring stop processing is equal to the predetermined driving frequency.

11. The method for imaging according to claim 5, wherein the monitoring stop processing starts concurrently with a first vertical synchronizing signal, and wherein the forming of the analog image signal starts concurrently with a second vertical synchronizing signal, and wherein the second vertical synchronizing signal occurs subsequent to the first vertical synchronizing signal.

12. The method for imaging according to claim 5, further comprising the step of performing still image exposure, and wherein a frequency of a vertical synchronizing signal during the still image exposure is greater than the predetermined driving frequency.

13. The method for imaging according to claim 12, wherein a frequency of the vertical synchronizing signal before the start of the monitoring stop processing is equal to the predetermined driving frequency.

* * * * *